Figure 1:
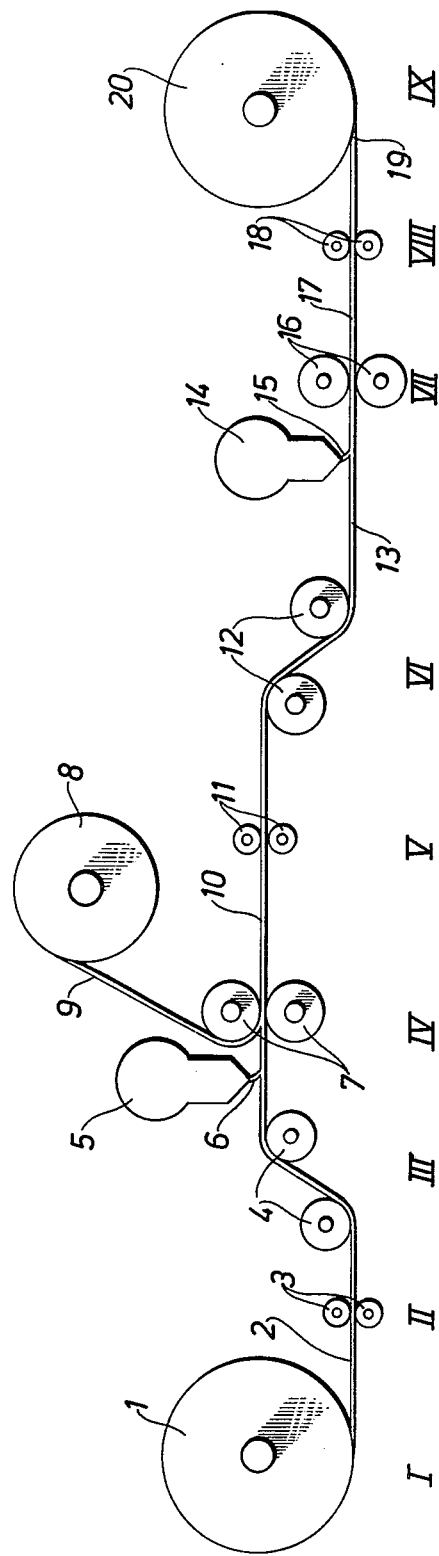

United States Patent [19]

Holmström et al.

[11] 4,256,791

[45] Mar. 17, 1981

[54] WEBLIKE LAMINATED PACKING MATERIAL AND A METHOD FOR THE MANUFACTURE OF SUCH A MATERIAL

[75] Inventors: Sven N. H. Holmström, Löberöd; Knut A. Rosenberg, Lomma, both of Sweden

[73] Assignee: Tetra Pak International AB, Lund, Sweden

[21] Appl. No.: 94,387

[22] Filed: Nov. 15, 1979

[30] Foreign Application Priority Data

Nov. 24, 1978 [SE] Sweden ............................ 7812142

[51] Int. Cl.³ ............................................ B32B 31/18
[52] U.S. Cl. ...................................... 428/77; 156/259; 156/264; 156/265; 156/271; 428/60; 428/189; 428/191; 428/192
[58] Field of Search ....................... 428/36, 57, 58, 59, 428/60, 61, 77, 84, 127, 128, 129, 189, 191, 192; 156/203, 215, 217, 218, 259, 264, 265, 271, 297

[56] References Cited

U.S. PATENT DOCUMENTS 2,900,289   8/1959   Harlan .................................... 428/60

*Primary Examiner*—Marion McCamish
*Attorney, Agent, or Firm*—Burns, Doane, Swecker & Mathis

[57] ABSTRACT

A web-like laminated material with a projecting edge strip is disclosed. The laminated material comprises at least one carrier layer and at least one intermediate metal foil layer and at least one thermoplastic covering layer. The edge strip projects from at least one longitudinal edge of the carrier layer such that a portion of the layer of metal foil extends from the carrier layer and a wider portion of the covering thermoplastic layer extends from the metal foil layer. A method of manufacturing the web-like laminated material having such an edge strip is also disclosed.

10 Claims, 3 Drawing Figures a)

b)

c)

d)

e)

f)

g)

h)

WEBLIKE LAMINATED PACKING MATERIAL AND A METHOD FOR THE MANUFACTURE OF SUCH A MATERIAL

The present invention relates to a weblike, laminated packing material comprising at least one carrier layer of paper or cardboard, layers of thermoplastic material covering the outside of the laminate and at least one intermediate layer of metal foil. The invention also relates to the method for the manufacture of such weblike laminated packing material.

In the manufacture of non-returnable packing containers, e.g. for juice, fruit syrup, etc, packing containers are often formed such that a web of packing material is converted to a tube by joining together the longitudinal edges of the web, whereupon the tube is filled with the intended contents and sealed along narrow sealing zones situated at a distance from one another. The sealed portions of the tube holding the contents can then be separated from the tube by cutting through the said sealing zones and the sealed, separated tube portions may be shaped by folding, if required, to parallelepipedic packing containers, or they may be given a tetrahedral shape or an undefined cushionlike shape, depending on how the sealing joints are oriented.

These packages have the common characteristic that a cut edge of the packing material will be exposed to the contents if the tube joint is of the overlapping type. This in turn means that the contents can easily be absorbed by the packing material if the same comprises an absorbent material, e.g. paper or cardboard. For some contents and packing materials this fact represents no major problem, but if the contents are sterile and are packed under antiseptic conditions, the unprotected cut edge must not be allowed to come into contact with the contents. Rather the cut edge must be protected in some way.

In a known method the cut edge is covered by means of a longitudinal plastic strip which is advanced at the same time as the tube is formed. The said plastic strip is welded onto the inner plastic coating of the packing material tube on both sides of the longitudinal cut edge of the packing material web exposed towards the inside of the tube. Another method consists in sealing the packing material web inside surfaces to each other or of folding over one of the web edges, possibly after the same has been thinned out. Such a folding operation is laborious, however, and brings about serious problems of tightness on the transverse sealing joints, since these have to run over the longitudinal sealing joint of the tube. Yet another solution is that of using a so-called loose plastic strip to cover the cut edge of the packing material web exposed towards the inside of the packing material tube, but the method is expensive and may lead to non-sterile packages if the plastic strip during application is displaced sideways or in some other way fails to seal off the cut edge of the packing material. As mentioned above, the problem is most accentuated in the packing of sterile contents, but sealing of the cut edge of packing material webs is often used also in non-antiseptic packages so as to prevent the absorption of contents on the cut edge, this absorption in certain cases may mean that the rigidity of the packing material and consequently the rigidity of the whole package is put at risk.

A further and better method of solving the problem of the sealing off of the cut edge of the packing material consists in allowing in the manufacture of the packing laminate the inner plastic layer to project with an edge zone beyond the end of the carrier layer. During the manufacture of the packing material tube the inside of the said projecting plastic strip is then sealed to the inner plastic coating of the opposite edge zone, so that the cut edge is automatically sealed off.

In the antiseptic packaging of contents the packing material tube is often heated by means of a heating arrangement introduced into the tube, and to ensure sterility of the inside of the packing material tube the heating must be so intense that heat is transferred to the fibrous carrier material layer, which always contains varying amounts of water attached to the fibers. In connection with the heating, part of this water is evaporated. This means a formation of steam bubbles which may easily give rise to bursting in the longitudinal joint of the packing material tube, whether the same is covered by a loose plastic strip or a so-called fixed plastic strip integrated with the plastic layer of the packing material. Such bursting in the inner plastic layer cannot be allowed in an antiseptic package, since bacteria in the packing material may penetrate into the package and infect the sterile contents. By using a packing material laminate which includes a metal foil layer the abovementioned problem can to a large extent be eliminated and the heating of the carrier material layer reduced, but the cut edge of the packing material web continues to be unprotected by the aluminum foil layer, so that steam bubbles arise in the sealing joint itself and the risk exists of the plastic strip bridging the cut edge being broken. This risk can largely be eliminated if the projecting fixed plastic strip also comprises a metal foil strip projecting from the cut edge, which covers the cut edge area and protects the same against heating. A weblike laminated packing material in accordance with the invention thus solves the problems mentioned here, and such a packing material has at least on one of its longitudinal edges an edge strip projecting from the carrier layer which comprises one of the outer thermoplastic layers as well as the metal foil layer, the said plastic layer in turn extends beyond the longitudinal limiting edge of the metal foil layer so as to form a free plastic strip.

Packing material with a so-called fixed projecting strip, that is to say, one that is integrated with the inner plastic layer of the packing material, has been manufactured previously such that an inferior adhesion was imparted to the plastic layer in longitudinal zones of the carrier layer web, the plastic layer was then cut through and folded aside, whereupon a strip of the carrier layer could be cut away. It is also known that prior to the covering with plastic layers striplike parts of carrier material web can be cut away and finally it is known that by means of longitudinal cuts in the web the same can be cut into smaller partial webs which are separated sideways to be then jointly covered with plastics, and by means of renewed cutting, divided into partial webs with plastic strips projecting from the edge of the carrier material. However, it has not been known up to now to manufacture a laminate in accordance with the invention and thereby produce a packing material web with a freely projecting edge strip which on the one hand consists of metal foil and plastics, on the other hand of a plastic strip projecting from the metal foil. A method of manufacture for the laminate in accordance with the invention comprises dividing a wide web including the carrier layer material by means of a first cutting operation into a number of narrower first partial webs, which subsequently in a first web separating operation are passed over spreader rollers by means of which the partial webs are separated sideways, a space of desired width being produced between the partial webs. In a common operation a coherent layer of metal foil covering all partial webs is applied to all the first partial webs thus separated and is fixed to the partial webs. The wider web formed by the said first partial webs and the metal foil layer is divided by means of a second cutting operation into a number of narrower second partial webs by means of cuts through the metal foil layer close to the longitudinal edge of one of the adjoining first webs. The said second partial webs are passed over spreader rollers by means of which the partial webs are separated sideways to form a space between the partial webs. In a joint operation a thermoplastic layer covering all partial webs is applied to all the second partial webs thus separated and is fixed to the said second partial webs so as to form a wider contiguous web. Finally the wider web thus formed is separated in a third cutting operation to form a number of narrower third partial webs by means of cuts through the thermoplastic layer close to the said longitudinal edges on one of the adjacent partial webs.

Figure 2:
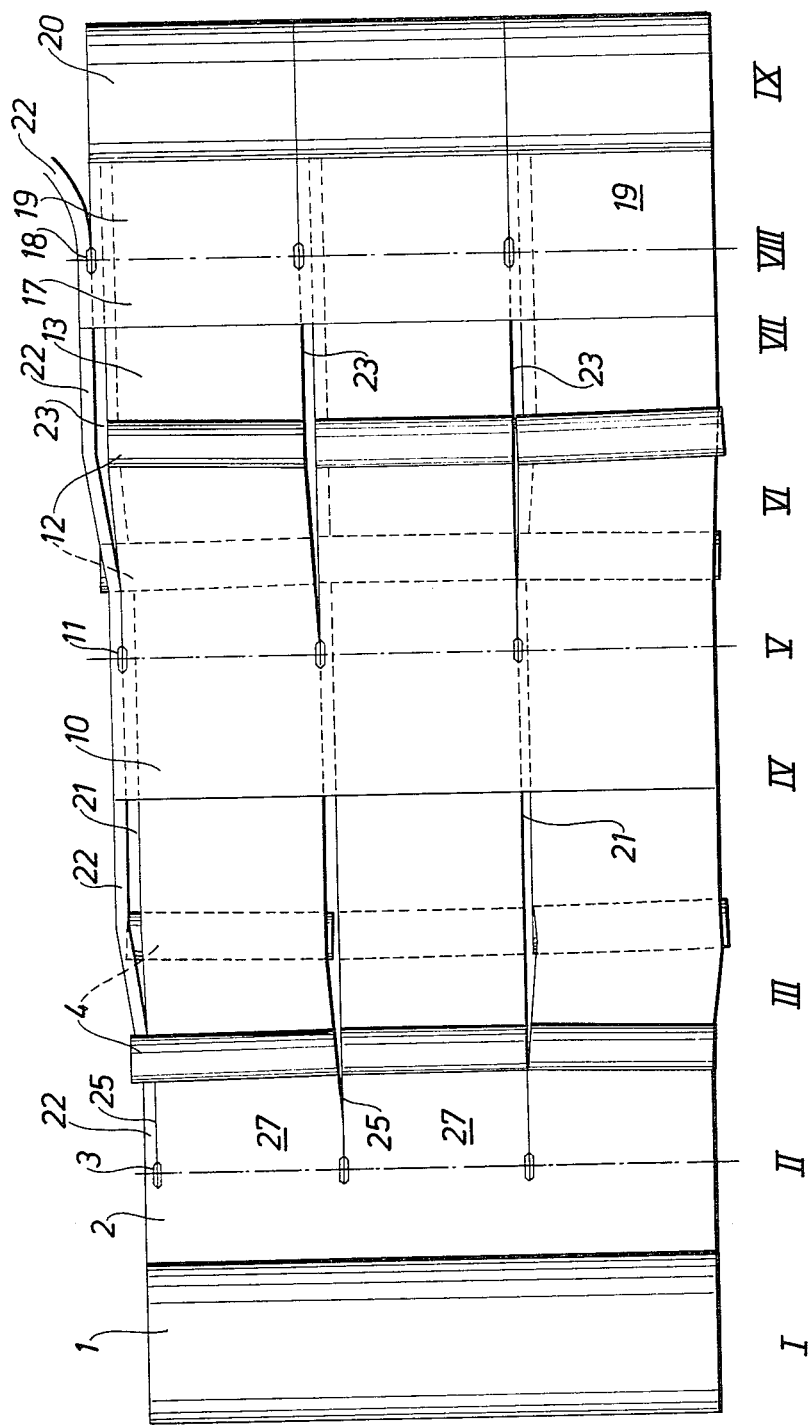

An preferred embodiment of the packing material in accordance with the invention as well as of the method for its manufacture will be described in the following with reference to the enclosed schematic drawing, wherein FIG. 1 is a diagrammatic sketch of an arrangement for the manufacture of the packing material in accordance with the invention, FIG. 2 is a top view of the packing materials method of manufacture, and FIGS. 3A-H is a cross-section through the packing material during different stages of manufacture.

The diagrammatic sketch shown in FIG. 1 of an arrangement for the manufacture of a packing material in accordance with the invention is divided into zones which are designated I-IX. In each of these zones the packing material is processed in order to obtain the final weblike laminate which is to be used for the manufacture of packing containers.

For the sake of clarity the manufacture of the packing material is described with joint reference to FIGS. 1 and 2, since in principle FIG. 2 constitutes a top view of FIG. 1.

In zone I a carrier layer of paper or cardboard 2 is rolled off a magazine roll 1. The carrier layer can be coated with plastics on at least one side in a preceding operation not described here, but this is not absolutely necessary for the invention. The carrier layer web 2 is divided in zone II into a number of partial webs by cutting the carrier layer by means of cutting discs 3 along cutting lines 25. The mutual position of the cutting discs is arranged so that the width of the partial webs 27 will correspond to the width of the carrier layer of the final packing material web. Even though this is not absolutely necessary it has proved advantageous to use an original or wide carrier material web whose width exceeds the combined widths of the partial webs 27, which means that a narrow strip 22 is cut off at one edge of the carrier layer web. This narrow strip 22 has proven to be valuable in the subsequent manufacturing process since it constitutes a support for any further laminate layers applied.

In zone III the partial webs 27 are guided over spreader rollers which in the case shown here consist of cylindrical rollers whose axes of symmetry are somewhat angularly displaced in relation to one another in such a manner that the partial webs are spread a little in relation to one another so that an adjustable space 21 is produced between the partial webs. The striplike portion 22 at the edge of the wide web may also be spread with the help of rollers, but owing to its relative narrowness it has been found advantageous to spread this thin edge with the help of a simple "finger" or guidebar. Instead of a number of separate cylindrical rollers it is possible to use a cambered roller, but in such a case the valuable possibility of adjustment is lost.

After the partial webs 27 and the narrow strip 22 have been displaced sideways in relation to one another to form spaces 21, all the partial webs 27 as well as the strip 22 are covered in zone IV in a common operation with a layer of thermoplastic material 6 which is extruded through an extruder 5. The said plastic layer 6 is arranged in a continuous layer over the partial webs as well as over the space between these, and while the plastic layer is still warm and plastic, a metal foil web, preferably aluminum foil web 9 reeled off a magazine roll 8, is applied to the plastic layer by means of pressure and cooling rollers 7. The width of the aluminum foil web 9 is such that it covers all the partial webs and the strip 22 together with the space between them, so that the partial webs are united once again to a wide material web 10 which is held together by the metal foil layer 9 which by means of the adhesive layer 6 is fixed to the partial webs 27.

In the zone V the "wide" web so formed is divided up once more into partial webs by means of cutting devices 11, which may consist of rotating knives or cutting discs, even though other cutting elements are conceivable. With the help of the cutting elements 11 the metal foil layer is cut in the space 21 between the partial webs 27 (and the strip 22) close to one edge of the carrier layer in such a manner that each new partial web obtains a striplike portion of metal strip projecting from the edge of the carrier layer. The strip 22, which is only intended to act as a support is not given any such projecting edge zone, thus the cutting element 11 cuts along the inside edge of the strip.

The new partial webs 27 provided with a projecting metal foil edge are passed in the zone VI once more spreader rollers 12 which in principle can be identical with the spreader rollers 4. With the help of the spreader rollers 12 the partial webs are spread in such a manner that a predetermined space 23 will be produced between the partial webs 13 themselves as well as between the strip 22 and the adjacent partial web.

In the zone VII the partial webs 13 divided sideways and the strip 22 are covered again with a continuous plastic layer 15 which is obtained from the extruder 14. The plastic layer 15, which preferably may be polyethylene, is normally thicker than the plastic layer 6 put down earlier which is only intended to act as an adhesive layer. The plastic layer 15 is fixed to the partial webs 13 with the help of pressure and cooling rollers 16 so as to form a new coherent "wide" web 17 such that the plastic layer 15 covers all the partial webs 13 and the strip 22 including the space 23 between the partial webs.

In the zone VIII the "wide" web 17 is separated again by means of cutting elements 18 which in principle can be identical with the cutting elements 11. The cutting elements 18 are situated so that they cut through the plastic layer 15 close to the same edge of the carrier layer partial webs 27 as in the previous cutting operation in zone V. In this way partial webs 19 are produced, each of which is provided with a projecting strip consisting of metal foil and plastic material, the plastic material projecting farther from the edge of the carrier layer than the metal foil material. The partial webs 19 are wound in zone IX onto magazine rolls 20, while the edge strip 22 is discarded as waste.

The packing material webs manufactured in the manner described above can now be used in automatic packing machines for the manufacture of packing containers such that the webs are formed into a tube by joining together the longitudinal edges of the webs in an overlap joint, the projecting strip being situated on the inside of the tube so as to cover the cut edge of the carrier material and to protect the same against the absorption of liquid as well as strong heating in connection with the sterilization of the packing material tube by means of heat.

Figure 3:
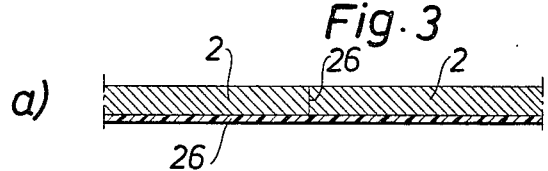
Figure 3:
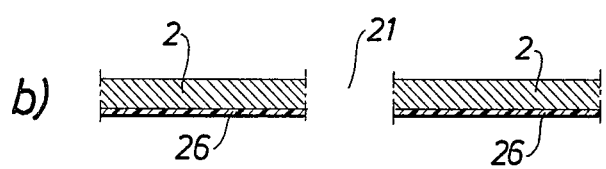
Figure 3:
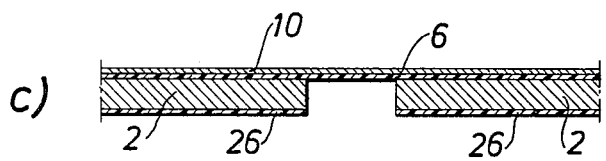
Figure 3:
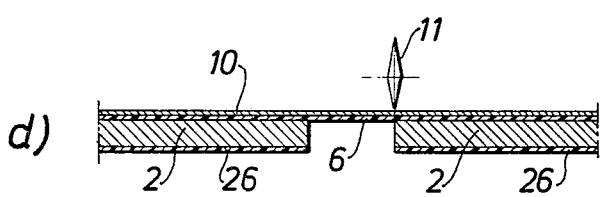
Figure 3:
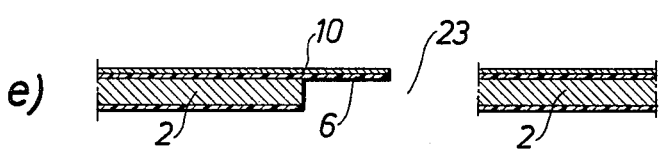
Figure 3:
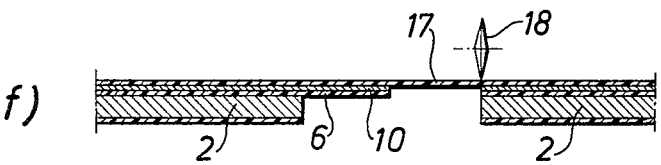
Figure 3:
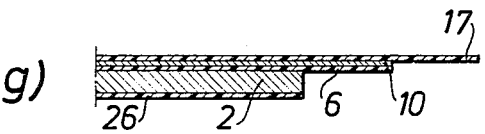
Figure 3:
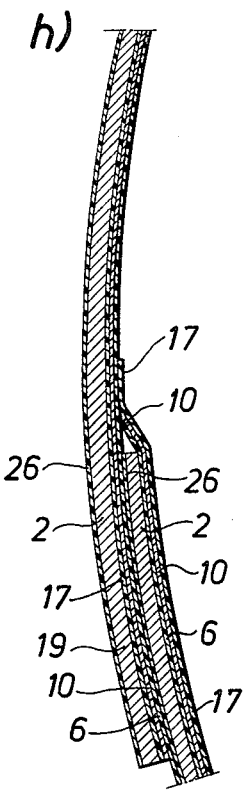

In FIG. 3 is shown in simplified form the packing laminate and its manufacture. It is noted that the material thicknesses have not been reproduced true to scale, but have been exaggerated in order to demonstrate the object more clearly.

In FIG. 3a the carrier layer 2 is shown with a thermoplastic coating 26 on one side thereof. The carrier layer 2 and the plastic coating 26 have been cut through by a cut 25 with the help of the said cutting discs 3, that is to say, FIG. 3a corresponds to the position II in FIGS. 1 and 2. In FIG. 3b, which corresponds to position III, the severed carrier layer has been separated with the help of the spreader rollers mentioned earlier, so that a space 21 is produced between adjoining partial webs. In FIG. 3c, which corresponds to position IV, the webs of the carrier layer have been covered with thermoplastic layer 6, and with a metal foil layer 10 which layers bridge the space 21 between the webs of the carrier layer 2. FIG. 3d corresponds to position V wherein the metal foil layer 10 and the plastic layer 6 have been cut through by a cutting disc close to one of the cut edges of the carrier layer web 2 so as to form a number of partial webs.

FIG. 3e corresponds to position VI, wherein the newly formed partial webs are separated with the help of spreader rollers so that a space 23 is produced between the webs, one of the webs having a strip projecting from the web edge which strip consists of metal foil 10 and plastic material 6.

FIG. 3f corresponds to positions VII and VIII, wherein the new and sideways displaced partial webs are covered by a coherent layer 17 of thermoplastic material, whereupon the said thermoplastic layer 17 is cut through by a cutting element 18 so as to form partial webs of the type shown in FIG. 3g. These partial webs are wound on to the magazine rolls in position IX.

The packing material web in accordance with FIG. 3g thus comprises a carrier layer 2 which on its lower side has a thermoplastic coating 26 and projecting edge strip projecting from the cut edge of the carrier layer 2 comprising a metal foil layer 10, and a plastic layer 17 which in turn projects beyond the edge of the metal foil layer 10.

In FIG. 3h is shown how a material web in accordance with the invention forms a tube. The figure presents the actual tube joint in considerable enlargement. As the figure shows, the edges of the web are made to overlap one another whereupon the outer plastic layer 26 of the packing laminate is brought into contact with the plastic layer 17, whereupon the plastic layers 26 and 17 are heated to such an extent that the plastic materials fuse together to form a homogeneous and durable sealing joint. The sealing can be performed by the supply of external heat while the area of the overlap is pressed together, but it is also possible to heat the plastic layers 26 and 17 with the help of high frequency heat which is generated in the metal foil layer 10 by means of a specially arranged high-frequency generator and transmission coil. As can be seen in FIG. 3h the cut edge of the packing material web which is turned inwardly towards the packing tube is covered by the projecting strip 17,10, the metal foil strip 10 effectively protecting the cut edge from any heating strong enough to boil the moisture in the cut edge of the fibrous layer while the longer projecting plastic strip 17 is sealed to the corresponding plastic layer 17 of the overlapping edge to form a tight and unbroken inner plastic lining of the tube.

A packing laminate in accordance with the invention has proven to be very practicable and appropriate for its purpose, especially in connection with antiseptic packaging. As mentioned previously, the problem of steam bubbles which can burst apart the joint formed is avoided. The method of manufacture of the material has also proven to be practical and inexpensive, since very little material is lost.

The principles, preferred embodiments and modes of operation of the present invention have been described in the foregoing specification. The invention which in intended to be protected herein should not be construed as limited to the particular forms disclosed, since these are to be regarded as illustrative rather than restrictive. Variations and changes may be made by those skilled in the art without departing from the spirit of the present invention.

We claim:

1. In a web-like laminated packing material of the type which may be formed into packing containers capable of holding sterile contents, which packing material has at least one carrier layer, at least one intermediate layer of metal foil, and at least one outer layer of thermoplastic material, the improvement wherein said material includes a strip projecting from at least one of the longitudinal edges of said carrier layer, said edge strip including at least one outer thermoplastic layer and at least one metal foil layer, with the at least one metal foil layer extending beyond at least one longitudinal edge of said at least one carrier layer and the at least one outer thermoplastic layer extending beyond at least one longitudinal edge of said at least one metal foil layer.

2. The packing material of claim 1, wherein the thermoplastic layer comprises polyethylene and the metal foil comprises aluminum foil.

3. The packing material of claim 1 wherein a thermoplastic layer is disposed between the metal foil layer and the carrier layer.

4. The packing material of claim 3 wherein the thermoplastic layer disposed between the metal foil layer and the carrier layer affixes the metal foil layer to the carrier layer.

5. The packing material of claim 3 wherein said thermoplastic layer disposed between the metal foil layer and the carrier layer is polyethylene.

6. A method for the manufacture of a web-like laminated packing material comprising:

cutting a carrier layer web into a plurality of first partial webs;

spreading the first partial webs so as to separate the longitudinal edges of said partial webs;

applying a metal foil layer to the separated first partial webs to form a first contiguous web;

cutting the first contiguous web into a plurality of second partial webs;

spreading the second partial webs so as to separate the longitudinal edges of said partial webs;

applying a thermoplastic layer to the separated second partial webs to form a second contiguous web; and cutting the second contiguous web.

7. The method of claim 6 wherein the first contiguous web is cut by cutting through the metal foil layer close to a longitudinal edge of one of the adjoining first partial webs.

8. The method of claim 7 wherein the second contiguous web is cut by cutting through the thermoplastic layer close to a longitudinal edge of one of the adjoining second partial webs.

9. The method of claim 6 further comprising providing the carrier web with a thermoplastic layer before the first cutting step.

10. The method of claim 6 wherein the thermoplastic layer is polyethylene and the metal foil is aluminum foil.